(12) United States Patent
Updegrove et al.

(10) Patent No.: US 6,502,303 B2
(45) Date of Patent: Jan. 7, 2003

(54) METHOD OF REPAIRING A TURBINE BLADE TIP

(75) Inventors: Kevin Updegrove, Carson City, NV (US); Peter Bader, Carson City, NV (US); Michael Foster, Owasso, OK (US)

(73) Assignee: Chromalloy Gas Turbine Corporation, San Antonio, TX (US)

( * ) Notice: Subject to any disclaimer, the term of this patent is extended or adjusted under 35 U.S.C. 154(b) by 0 days.

(21) Appl. No.: 09/850,362

(22) Filed: May 7, 2001

(65) Prior Publication Data

US 2002/0162220 A1 Nov. 7, 2002

(51) Int. Cl.⁷ ................................. B23P 15/00
(52) U.S. Cl. ................. 29/889.1; 29/402.08; 29/402.13
(58) Field of Search ........................ 29/889.1, 402.03, 29/402.04, 402.07, 402.08, 402.13; 228/119; 416/97 R, 213 R

(56) References Cited

U.S. PATENT DOCUMENTS

| | | | |
|---|---|---|---|
| 3,606,580 A | 9/1971 | Kaufman, Sr. | 416/232 |
| 3,854,842 A | 12/1974 | Caudill | 415/116 |
| 4,010,531 A | 3/1977 | Andersen et al. | 29/156.8 H |
| 4,169,020 A | 9/1979 | Stalker et al. | 204/16 |
| 4,214,355 A | 7/1980 | Zelahy | 29/156.8 B |
| 4,232,995 A | 11/1980 | Stalker et al. | 415/172 A |
| 4,390,320 A | 6/1983 | Eiswerth | 416/97 R |
| 4,411,597 A | 10/1983 | Koffel et al. | 416/92 |
| 5,359,770 A | 11/1994 | Brown et al. | 29/889.1 |
| 5,800,695 A * | 9/1998 | Kang et al. | 205/135 |
| 5,876,183 A | 3/1999 | Furlan et al. | 416/213 R |
| 6,037,563 A * | 3/2000 | Foster et al. | 219/121.63 |
| 6,054,672 A * | 4/2000 | Foster et al. | 148/525 |
| 6,107,598 A * | 8/2000 | Updegrove et al. | 219/121.6 |
| 6,165,345 A * | 12/2000 | Updegrove et al. | 205/17 |
| 6,187,450 B1 | 2/2001 | Budinger et al. | 428/546 |
| 6,332,272 B1 * | 12/2001 | Sinnott et al. | 29/402.08 |
| 6,333,484 B1 * | 12/2001 | Foster et al. | 219/121.64 |
| 6,376,800 B1 * | 4/2002 | Updegrove et al. | 219/121.6 |

* cited by examiner

Primary Examiner—I Cuda Rosenbaum
(74) Attorney, Agent, or Firm—Mitchell D. Bittman

(57) ABSTRACT

A blade tip cap of a turbine blade is repaired by restoring the tip rail and attaching a strengthening rib across the blade tip cap connecting the concave wall to the convex wall of the tip rail.

5 Claims, 1 Drawing Sheet

METHOD OF REPAIRING A TURBINE BLADE TIP

BACKGROUND OF THE INVENTION

It is relatively common for high pressure turbine blades, as used in large combustion turbine engines, to be designed with a blade tip cap at the blade tip, the turbine blade having an airfoil-shaped hollow body with an airfoil shaped blade tip cap. The blade tip cap 2 generally has an airfoil shaped closure plate 3 and a tip rail 4 extending around the circumference of the turbine blade at the tip (see FIGS. 1 and 2). The tip rail may completely enclose the tip pocket, or may have a slot or opening, typically at the trailing edge on the concave side. In either case, it is a mandatory part of any standard blade refurbishment process to restore the overall blade length, including the rail around the tip cap pocket.

When the blades run in the engine, the tip of the blades have a very tight clearance with the engine case to prevent gasses flowing through the engine from passing in an inefficient fashion over the tops of the blades. In most engine designs, the blades actually contact a rub surface in the engine case. There is therefore some amount of physical wear on the blade tips. If the contact is extreme, it may result in fracture or breakage of portions of the tip rail. Blade damage of this type is dependent upon the basic blade design, along with the operating conditions experienced by any individual engine.

Turbine blades that are particularly susceptible to fracture of tip rails around the blade tip cap pocket are designed and manufactured with a very tall, thin rail around the blade tip. The tip rail is typically 0.250"–0.300" high, with a wall thickness as thin as 0.015". It is common for the tip rail on these blades to fracture during engine operation. The breakage occurs on both new and previously repaired parts and regardless of the type of alloy used to restore the tip rail. Even though engines may be allowed to operate with this type of distress, there is a measurable performance loss due to lack of proper clearances at the tips of the affected blades. The performance loss translates into increased operating costs to the engine operators. There is also significant adverse cost impact when engines must be removed from service for repair of these damaged blades.

SUMMARY OF THE INVENTION

Briefly, a process is provided for repairing a blade tip cap of a turbine blade comprising restoring the tip rail of the blade tip cap and attaching a strengthening rib across the blade tip cap connecting a concave wall to a convex wall of the tip rail. Preferably, the strengthening rib is positioned over an internal rib below the blade tip cap of the turbine blade.

BRIEF DESCRIPTION OF THE DRAWINGS

The present invention will be more easily understood by reference to the following description taken in conjunction with the appended drawings, wherein.

DETAILED DESCRIPTION OF THE INVENTION

Figure 1:
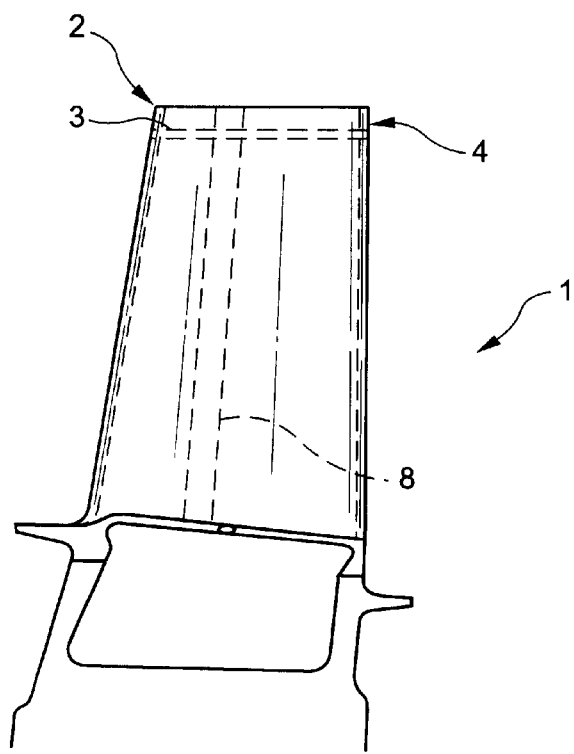
FIG. 1 is a side view of a turbine blade showing the strengthening rib incorporated according to this invention.
Figure 2:
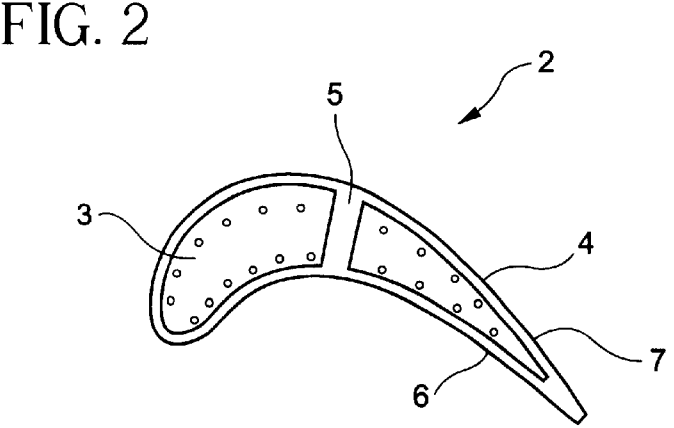
FIG. 2 is an end view of a blade tip cap according to this invention.

This invention provides a method of repairing blade tips, involving the incorporation of a strengthening rib 5 that spans the blade tip cap connecting the concave wall 6 to the convex wall 7 of the tip rail 4 (see FIGS. 1 and 2). Preferably, the strengthening rib 5 is positioned above a central rib 8 cast into the blade internal cavity below the blade tip cap 2 surface to provide additional strength to the tip rail 4. The strengthening rib is incorporated into the blade tip during the performance of a conventional blade length restoration repair to provide additional support to the tip rail. The strengthening rib is a cost effective solution to the tip rail breakage problem. Implementation of this repair process will save engine operators the otherwise unnecessary expenses related to engine overhauls or performance losses due to tip rail breakage.

This repair process can be easily accomplished during the performance of a standard tip repair, utilizing existing laser welding equipment with no additional tooling. The new blade tip cap configuration does not adversely affect blade airflow, weight, or balance. While a specific configuration has been described, other similar configurations that achieve the same basic goal are possible. For instance, the stiffening rib could connect the concave and convex walls, but not extend all the way to the top of the blade tip. This same repair scheme can be successfully applied to any turbine blades with a substantially similar blade tip cap configuration.

EXAMPLE 1

A CF6-50 second stage high pressure turbine blade was determined to be a suitable candidate for tip length restoration. The blade was then processed through all of the standard repair procedures up until the tip crack welding operation. The primary operations prior to weld consist of internal cleaning, removal of coating at the blade tip, vacuum stress relief cycles, removal of most of the remaining tip rail, and notching to remove cracks at the blade tip. Cracks at the blade tip were then restored by manual welding at elevated temperature.

At the same time, a single pass of weld was applied across the blade tip cap joining the residual concave and convex wall of the tip rail. The weld pass was positioned immediately on top of the internal rib below the tip cap surface. X-ray and fluorescent penetrant inspections were performed to ensure that all cracks had been repaired. The residual blade tip rail was then ground perfectly flat in preparation of preheated interactive laser weld.

During repair, a preheated interactive laser welding system (see U.S. Pat. Nos. 5,374,319 and 5,554,837) welds a series of passes around the circumference of the blade tip to restore the tip rail and therefore the overall blade length. To implement this invention, the weld program was modified in order to add material across the tip rail and strengthening rib surface during each weld pass. The result was a strengthening rib welded integrally to the blade tip cap, connecting the concave and convex walls of the tip rail (FIG. 2). After laser weld, the blade was ground to final length and the external contour was restored. Due to the precision of the laser weld process, it was not necessary to EDM or otherwise dress the internal contour of the blade tip cap pockets. Final NDT, heat treatment, and coating operations were performed. The blade was then subjected to destructive metallurgical analysis. The structure and integrity of the tip weld was acceptable.

What is claimed is:

1. A process for repairing a turbine blade having an airfoil-shaped hollow body and an airfoil shaped blade tip cap, the blade tip cap having an airfoil shaped closure plate and a tip rail extending around the circumference of the turbine blade on the closure plate comprising:

restoring the tip rail of the blade tip cap, the tip cap not being removed form the turbine blade; and attaching a strengthening rib across the blade tip cap connecting a concave wall to a convex wall of the tip rail.

2. Process of claim 1 wherein the strengthening rib is positioned over an internal rib below the blade tip cap of the turbine blade.

3. Process of claim 2 wherein the tip rail is restored by welding and the strengthening rib is attached by welding.

4. Process of claim 3 wherein the strengthening rib extends from the closure plate to the top of the tip rail.

5. Process of claim 3 wherein the strengthening rib extends from the closure plate to below the top of the tip rail.

* * * * *